W. H. FILLMAN.
HEADLIGHT FOR AUTOMOBILES OR THE LIKE.
APPLICATION FILED MAR. 29, 1919.
1,318,440.
Patented Oct. 14, 1919.
2 SHEETS—SHEET 1.
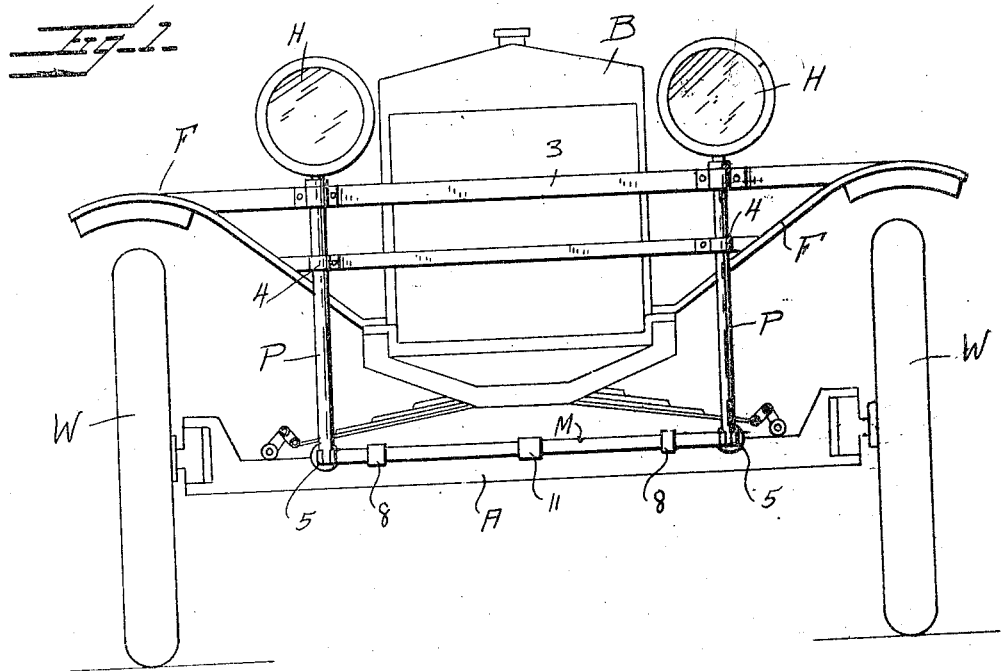
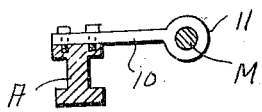
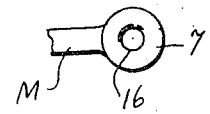
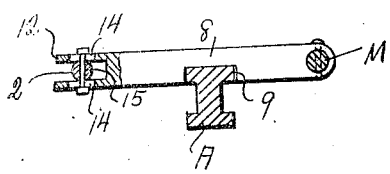
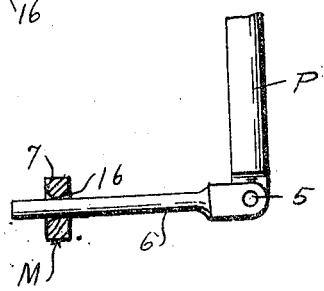
Inventor
W. H. Fillman
By Watson E. Coleman
Attorney W. H. FILLMAN.
HEADLIGHT FOR AUTOMOBILES OR THE LIKE.
APPLICATION FILED MAR. 29, 1919.
1,318,440.
Patented Oct. 14, 1919.
2 SHEETS—SHEET 2.
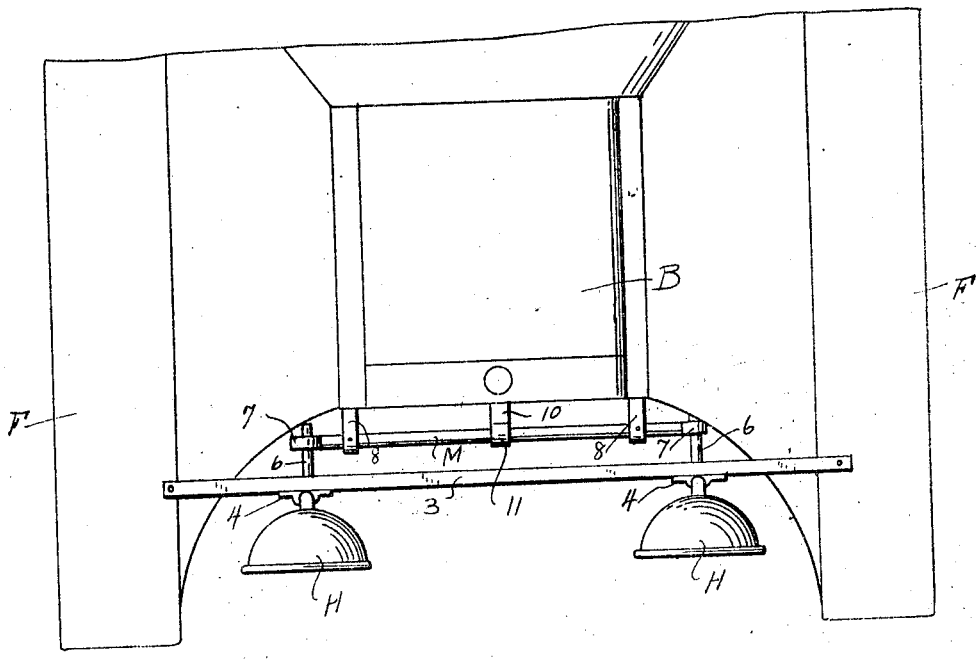
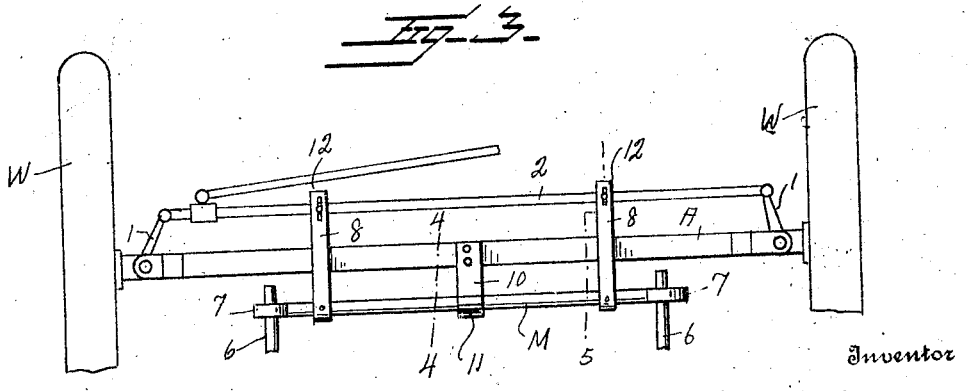
Inventor
W. H. Fillman
By Watson E Coleman
Attorney

UNITED STATES PATENT OFFICE.

WILLIAM H. FILLMAN, OF GRACEDALE, PENNSYLVANIA.

HEADLIGHT FOR AUTOMOBILES OR THE LIKE.

1,318,440.  Specification of Letters Patent.  Patented Oct. 14, 1919.

Application filed March 29, 1919. Serial No. 285,979.

*To all whom it may concern:*

Be it known that I, WILLIAM H. FILLMAN, a citizen of the United States, residing at Gracedale, in the county of Luzerne and State of Pennsylvania, have invented certain new and useful Improvements in Headlights for Automobiles or the like, of which the following is a specification, reference being had to the accompanying drawings.

This invention relates to certain improvements in headlights for automobiles or the like, and it is an object of the invention to provide novel and improved means whereby the headlight may be caused to turn in unison with and in the same general direction as the steering wheels of the vehicle so that effective illumination of the roadway will be obtained in advance of the vehicle during a turn.

It is also an object of the invention to provide a headlight of this general character having novel and improved means coacting therewith and engaged with a steering rod for imparting the desired movement to the headlight when the steering wheels are adjusted to effect a change in the direction of travel of the vehicle.

Another object of the invention is to provide in connection with a headlight of this character novel and improved means supported by an axle of the vehicle and operatively engaged with the headlight and a steering rod to cause the headlight to move in unison with and turn in the same general direction as the movements of the steering wheels of the vehicle to effect a change in the direction of travel.

The invention consists in the details of construction and in the combination and arrangement of the several parts of my improved headlight whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in front elevation illustrating a vehicle having applied thereto a mechanism constructed in accordance with an embodiment of my invention.

Fig. 2 is a fragmentary view in top plan of the structure illustrated in Fig. 1.

Fig. 3 is a fragmentary view in top plan of the structure as herein disclosed with the body of the vehicle removed.

Fig. 4 is an enlarged sectional view taken substantially on the line 4—4 of Fig. 3.

Fig. 5 is an enlarged sectional view taken substantially on the line 5—5 of Fig. 3.

Fig. 6 is a fragmentary view, partly in section and partly in elevation, illustrating the connection between a lamp-post and the operating member therefor, and Fig. 7 is a fragmentary view in front elevation of an end portion of the operating member for a lamp-post.

As disclosed in the accompanying drawings, A denotes the front axle of an automobile or other vehicle and which has engaged with its opposite extremities the steering wheels W. The arms 1 of the spindles of the wheels W are connected in a well known manner by the steering rod 2.

B denotes the forward end portion of the vehicle body supported by the axle A and extending laterally from the opposite sides of the body B are the fenders F overlying the wheels W in a well known manner. Connecting the fenders F is a pair of transversely disposed rigid members or beams 3. The beams 3 are vertically spaced and provided adjacent their opposite end portions with the bearings 4 to rotatably support the vertically disposed lamp-posts P.

The upper end portion of each of the posts P has engaged therewith a headlight or lamp H of any desired type and which is normally disposed straight ahead. Either or both of the cross members or beams 3 may have secured thereto a license plate or the like.

Pivotally engaged, as at 5, with the lower end portion of each of the posts P is the forward extremity of an arm 6 having vertical swinging movement or swinging movement longitudinally of the posts P. The rear or free end portion of the arm 6 is preferably rounded and is loosely directed through an eye 7 arranged at an end of an operating member M.

The member M is disposed longitudinally of the axle A and in advance thereof and is suitably secured adjacent its opposite ends to a rearwardly directed and horizontally disposed bar 8. The bar 8 is of a length to extend rearwardly of the axle A and the under surface of said bar intermediate its length is provided with a transversely disposed groove or channel 9 into which extends the upper surface of the axle A. By this means it will be at once noted that each of the bars 8 is capable of sliding movement longitudinally of the axle A.

To further support the member M and maintain the same in applied position, I find it of advantage to provide the axle A substantially midway of its length with a forwardly directed bracket 10 having its outer end portion provided with an eye 11 through which the member M is loosely directed.

The inner end portion of each of the bars 8 is provided with a pair of spaced arms or extensions 12 between which the rod 2 extends. The arms or extensions 12 are provided with longitudinally disposed slots 14 through which extend the opposite end portions of the bolt 15 or the like, so that as the steering rod 2 is moved to control the direction of travel of the vehicle, endwise movement will be imparted to the member M to cause each of the headlights or lamps H to turn in unison with and in the same general direction as the steering wheels.

In order to facilitate the movement of each of the arms through the coacting eye of the member M, the inner wall 16 of said eye 7 is rounded or otherwise chamfered.

From the foregoing description, it is thought to be obvious that a headlight constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A dirigible headlight mechanism for automobiles comprising in combination with an axle and a steering rod positioned adjacent the axle, a pair of rotatable lamp-posts, arms pivotally engaged with said lamp-posts for movement in a vertical direction, members slidably engaged with the axle and extending forwardly and rearwardly thereof, a member disposed longitudinally of the axle and secured to the forward ends of the first named members, said second named member being provided with openings through which the arms of the posts are loosely directed, and connections between the rear end portions of the first named members and the steering rod.

2. A dirigible headlight mechanism for automobiles comprising in combination with an axle and a steering rod positioned adjacent the axle, a pair of rotatable lamp-posts, arms pivotally engaged with said lamp-posts for movement in a vertical direction, members slidably engaged with the axle and extending forwardly and rearwardly thereof, a member disposed longitudinally of the axle and secured to the forward ends of the first named members, said second named member being provided with openings through which the arms of the posts are loosely directed, connections between the rear end portions of the first named members and the steering rod, and an outstanding bracket carried by the axle between the first named members and through which the second named member is loosely directed.

3. A dirigible headlight mechanism for automobiles comprising in combination with an axle and a steering rod positioned adjacent the axle, a pair of rotatable lamp-posts, arms pivotally engaged with said lamp-posts for movement in a vertical direction, members slidably engaged with the axle and extending forwardly and rearwardly thereof, a member disposed longitudinally of the axle and secured to the forward ends of the first named members, said second named member being provided with openings through which the arms of the posts are loosely directed, the rear end portions of each of the first named members being provided with vertically spaced slotted arms between which the steering rod extends, said steering rod being provided with projections extending within said slots.

In testimony whereof I hereunto affix my signature in the presence of two witnesses.

WILLIAM H. FILLMAN.

Witnesses:
W. W. FOSTER,
U. E. HOUSER.